(12) United States Patent
Kim et al.

(10) Patent No.: US 8,811,268 B2
(45) Date of Patent: Aug. 19, 2014

(54) APPARATUS AND METHOD FOR CONFIGURING COMPONENT CARRIER IN WIRELESS COMMUNICATION SYSTEM

(75) Inventors: Ki Tae Kim, Suwon-si (KR); Jae Hyun Ahn, Seongnam-si (KR)

(73) Assignee: Pantech Co., Ltd., Seoul (KR)

( * ) Notice: Subject to any disclaimer, the term of this patent is extended or adjusted under 35 U.S.C. 154(b) by 154 days.

(21) Appl. No.: 13/518,326

(22) PCT Filed: Dec. 10, 2010

(86) PCT No.: PCT/KR2010/008841
§ 371 (c)(1),
(2), (4) Date: Jun. 21, 2012

(87) PCT Pub. No.: WO2011/087212
PCT Pub. Date: Jul. 21, 2011

(65) Prior Publication Data
US 2012/0263067 A1    Oct. 18, 2012

(30) Foreign Application Priority Data

Jan. 13, 2010 (KR) .......................... 10-2010-0003064
Jun. 4, 2010 (KR) .......................... 10-2010-0053057

(51) Int. Cl.
*H04B 7/204*    (2006.01)
*H04W 80/04*    (2009.01)

(52) U.S. Cl.
CPC ............. *H04B 7/2045* (2013.01); *H04W 80/04* (2013.01)
USPC .................... 370/319; 370/310.2; 370/395.42

(58) Field of Classification Search
CPC ............... H04B 7/2045; H04B 7/2621; H04L 2012/5679; H04W 80/04
USPC .......... 370/310.2, 328, 338, 319, 344, 395.42
See application file for complete search history.

(56) References Cited

U.S. PATENT DOCUMENTS 8,064,834 B2 * 11/2011 Kim et al. ................. 455/45
8,620,335 B2 * 12/2013 Lindstrom et al. .......... 455/450
2009/0137241 A1    5/2009 Yavuz et al.
2009/0247166 A1   10/2009 Luo et al.
2009/0264077 A1   10/2009 Damnjanovic
2009/0268684 A1   10/2009 Lott et al.
2013/0142134 A1 *  6/2013 Zhu et al. ................ 370/329

OTHER PUBLICATIONS

International Search Report issued for related International Patent Application No. PCT/KR2010/008841 dated Aug. 2, 2011.

* cited by examiner

*Primary Examiner* — Brenda H Pham
(74) *Attorney, Agent, or Firm* — H.C. Park & Associates, PLC

(57) ABSTRACT

The present invention relates to an apparatus and a method for determining a preferred component carrier (CC) to be used by a first station and a second station in a wireless communication system using a plurality of component carriers (CCs). According to the present invention, it is possible to lower inter-cell interference (ICI) with adjacent cells between the first station and the second station, and to improve the transmission efficiency. Further, the invention is capable of efficiently operating the plurality of component carriers.

13 Claims, 14 Drawing Sheets

FIG. 3
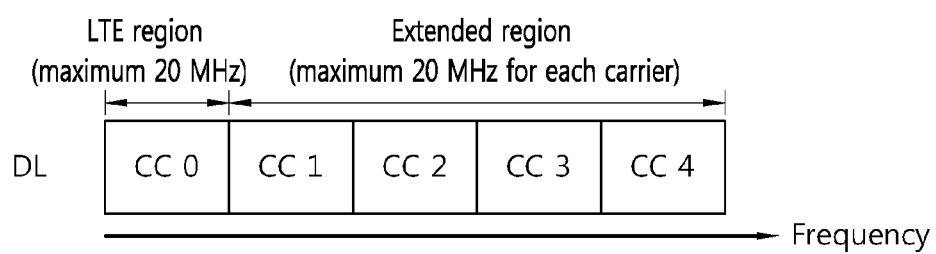
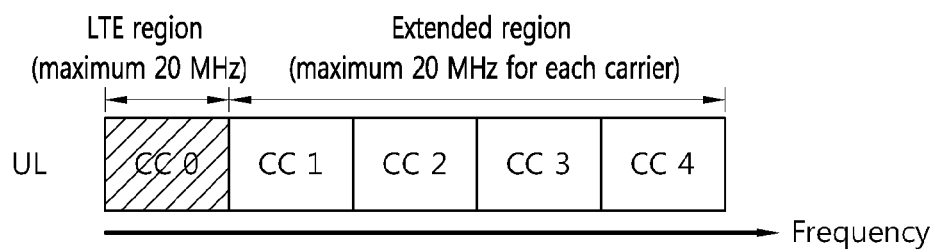

FIG. 4
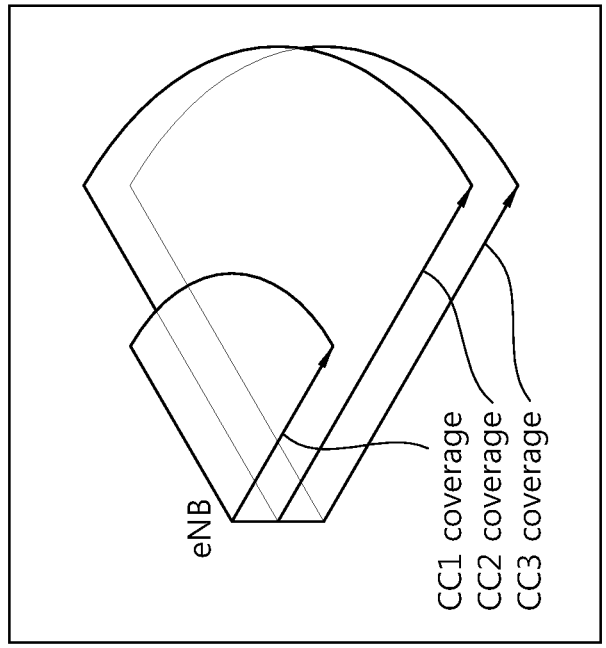
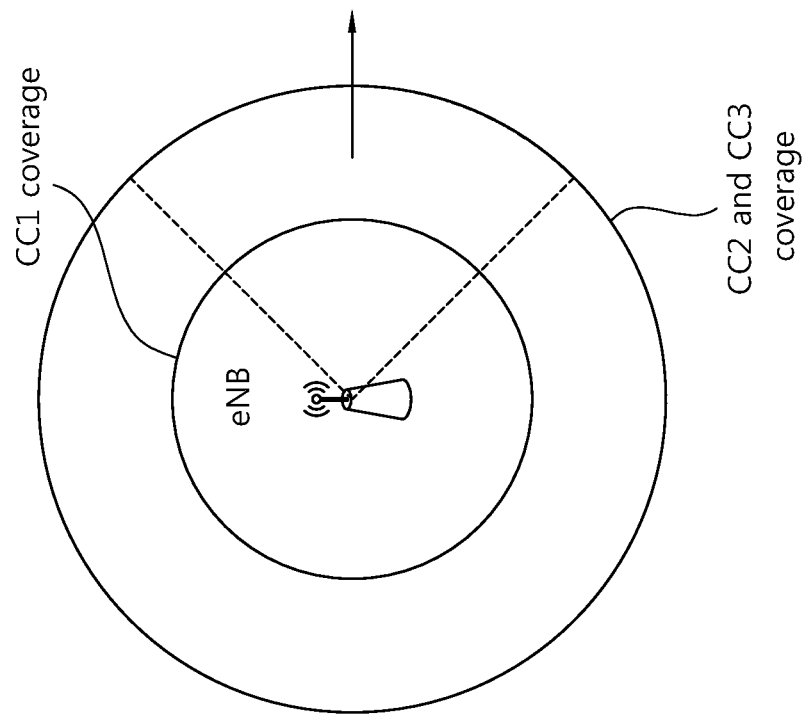

FIG. 7
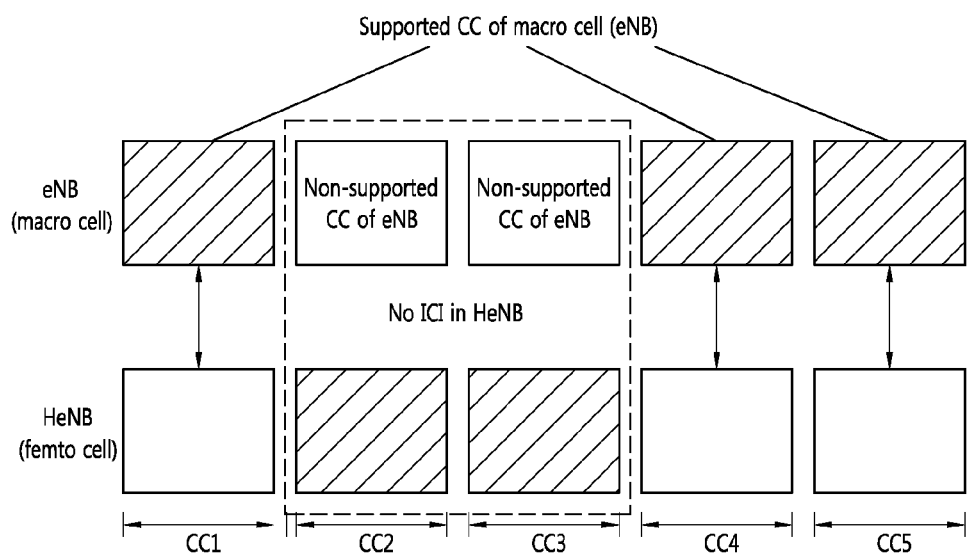
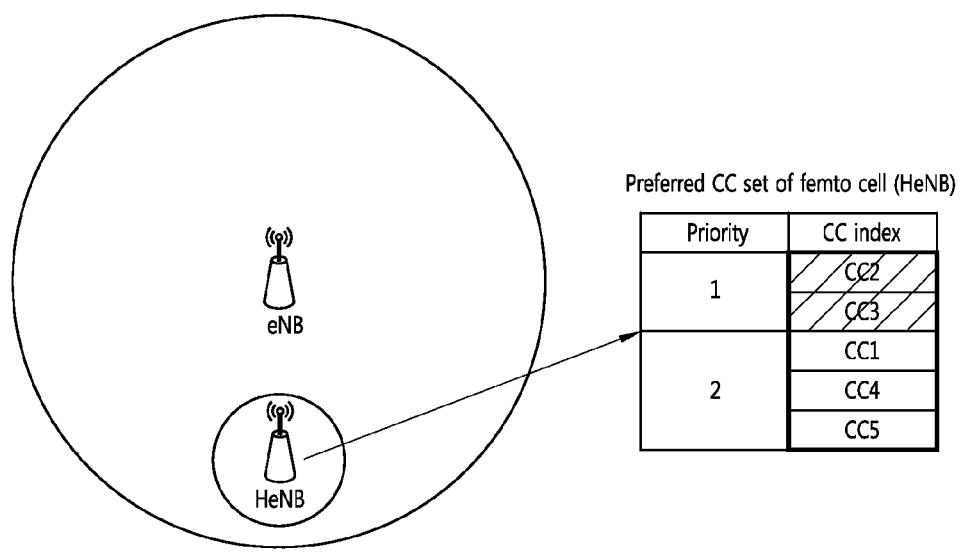

APPARATUS AND METHOD FOR CONFIGURING COMPONENT CARRIER IN WIRELESS COMMUNICATION SYSTEM

CROSS-REFERENCE TO RELATED APPLICATIONS

This application is the National Stage Entry of International Application PCT/KR2010/008841, filed on Dec. 10, 2010, and claims priority from and the benefit of Korean Patent Application No. 10-2010-0003064, filed on Jan. 13, 2010 and Korean Patent Application No. 10-2010-0053057, filed on Jun. 4, 2010, all of which are incorporated herein by reference for all purposes as if fully set forth herein.

BACKGROUND

1. Field

The present invention relates to a wireless communication system and, more particularly, to an apparatus and method for configuring component carriers, in which preferred CCs including one or more CCs are determined.

2. Discussion of the Background

With the development of a communication system, service providers and consumers, such as individuals, want to use various wireless communication devices.

A Long Term Evolution-Advanced (LTE-A) system, that is, the next-generation communication system which has been developed on the basis of 3GPP is a communication system for a high speed and a large capacity, which is capable of transmitting and receiving various data including images and radio data, including service based on voice. The next-generation communication system requires the development of technology capable of transmitting high-capacity data comparable to a wired communication network and also requires a proper error detection method capable of improving system performance by minimizing a reduction in information loss and improving system transmission efficiency.

Furthermore, in the next-generation communication system, such as the LTE and LTE-A, a Heterogeneous Network (hereinafter referred to as an 'HetNet') is taken into consideration as one of factor techniques for increasing transmission efficiency and expanding service coverage.

The HetNet means a communication system in which a second network node exists within the coverage area of a first network node in the same communication system. A communication system, including macro cells meaning common cells, microcells or pico cells, that is, cells smaller than the macro cells, hot spots or relay nodes, or femto cells, may be assumed as an example of the HetNet. Here, at least one femto cell may support a terminal under the control of a femto BS, and the femto BS may also be called a Home eNodeB.

In the HetNet environment, cells having a small coverage, such as microcells, pico cell, hot spots, or femto cells which exist within a macro cell, have limited transmit power.

More particularly, in a wireless communication system, if system frequency bands overlap with each other between network nodes, the network nodes may greatly experience Inter-Cell Interference (ICI). In particular, there is a possibility that the ICI ratio of a pico cell may be suddenly changed by various environment factors of a macro cell.

Accordingly, a wireless communication system requires efficient Inter-Cell Interference Coordination (ICIC).

SUMMARY

The present invention provides an apparatus and method for determining preferred Component Carriers (CCs) including one or more CCs in a wireless communication system.

Furthermore, the present invention provides an apparatus and method for configuring CCs for a second station by taking a first station into consideration in a wireless communication system.

Furthermore, the present invention provides an apparatus and method for determining preferred CCs to be used by a first station and a second station in a wireless communication system in which a plurality of CCs is used.

Furthermore, the present invention relates to an apparatus and method for configuring preferred CCs used by a second station which exists within the coverage of a first station in a wireless communication system.

Furthermore, the present invention provides an apparatus and method for determining preferred CCs to be used by a second station on the basis of use information about each of the CCs of a first station neighboring the second station in a wireless communication system in which the first station and the second station exist.

Furthermore, the present invention provides an apparatus and method for configuring CCs by using priority information about each of CCs which have been received by a reception apparatus linked to a second station in a wireless communication system in which a first station and the second station exist.

Furthermore, the present invention provides an apparatus and method for determining priority of CCs by taking received signal power on each CC into consideration in a wireless communication system.

Furthermore, the present invention provides an apparatus and method for changing priority information about CCs by taking received signal power on each CC into consideration in a wireless communication system.

According to an aspect of the present invention, there is provided a method of performing interference coordination in a multiple component carrier system. The method includes the steps of receiving use information about a Component Carrier (hereinafter referred to as a 'CC') allocated to a first cell, determining a preferred CC including at least one CC to be primarily allocated to a second cell based on the use information about the CC allocated to the first cell, and transmitting information about the preferred CC, including the at least one CC, to user equipment.

According to another aspect of the present invention, there is provided an apparatus for performing interference coordination in a multiple component carrier system. The apparatus includes a transceiver unit for receiving use information about a Component Carrier (hereinafter referred to as a 'CC') allocated to a first cell, and a determination unit for determining a preferred CC including at least one CC to be primarily allocated to a second cell based on the use information about the CC allocated to the first cell.

According to yet another aspect of the present invention, there is provided a method of performing interference coordination in a multiple component carrier system. The method includes the steps of determining a preferred Component Carrier (CC) including at least one CC to be primarily allocated to a second cell by taking use information about a CC allocated to a first cell into consideration, and transmitting preferred CC information indicative of the determined preferred CC to the second cell.

According to further yet another aspect of the present invention, there is provided an apparatus for performing interference coordination in a multiple component carrier system. The apparatus includes a preferred Component Carrier (CC) determination unit for determining, based on use information about a CC allocated to a first cell, a preferred CC including at least one CC to be primarily allocated to a second cell, and a transmission unit for transmitting preferred CC information indicative of the determined preferred CC to the second cell.

According to still yet another aspect of the present invention, there is provided a method of performing interference coordination by user equipment (UE) in a multiple component carrier system. The method includes the steps of receiving, from a base station (BS), information about a preferred Component Carrier (CC), including at least one CC to be primarily allocated to a second cell based on use information about a CC allocated to a first cell, checking priority of CCs to be used by the UE based on the information about the preferred CC including the at least one CC, and requesting, to the BS according to the checked priority, at least one of a reconfiguration request for at least one CC, a resource allocation request for at least one CC to be used, and a change request for the preferred CC.

According to further yet another aspect of the present invention, there is provided user equipment (UE) for performing interference coordination in a multiple component carrier system. The user equipment includes a preferred Component Carrier (CC) information reception unit for receiving information about a preferred CC, including at least one CC to be primarily allocated to a second cell based on use information about a CC allocated to a first cell, a CC configuration unit for checking priority of CCs to be used by the UE based on the information about the preferred CC including the at least one CC, and a resource allocation unit for transmitting, to a base station (BS) according to the checked priority, at least one of a reconfiguration request for at least one CC, a resource allocation request for at least one CC to be used, and a change request for a preferred CC.

In accordance with the present invention, in a communication system in which a second network node exists within a first network node, ICI can be lowered, transmission efficiency can be improved, and a plurality of CCs can be efficiently operated.

BRIEF DESCRIPTION OF THE DRAWINGS

FIG. 3 shows an example of CCs which may be used in the present invention.

FIG. 4 is a diagram showing a different coverage for each CC to which the present invention is applied.

FIG. 7 is a diagram illustrating a concept that a preferred CC set is configured by taking whether service is supported into consideration according to the present invention.

DETAILED DESCRIPTION OF THE ILLUSTRATED EMBODIMENTS

Figure 1:
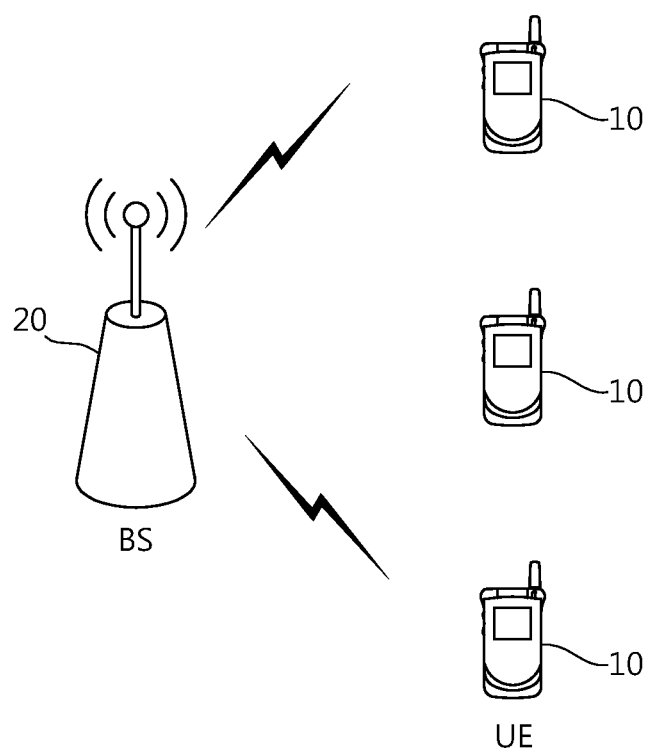
FIG. 1 is a diagram schematically showing a wireless communication system to which an embodiment of the present invention is applied.

Hereinafter, some embodiments of the present invention will be described in detail with reference to the accompanying drawings. It is to be noted that in assigning reference numerals to respective constituent elements in the drawings, the same reference numerals designate the same constituent elements throughout the drawings although the constituent elements are shown in different drawings. Furthermore, in describing the present invention, a detailed description of the known functions and constructions will be omitted if it is deemed to make the gist of the present invention unnecessarily vague.

Furthermore, in describing the elements of this specification, terms, such as the first, second, A, B, a, and b, may be used. However, the terms are used to only distinguish one element from the other element, but the essence, order, and sequence of the elements are not limited by the terms. Furthermore, 7 in the case in which one element is described to be "connected", "coupled", or "jointed" to the other element, the one element may be directly connected or coupled to the other element, but it should be understood that a third element may be "connected", "coupled", or "jointed" between the elements.

A station described hereinafter in this specification may refer to a fixed communication device or a mobile communication device which forms a communication node existing within the same communication system. The fixed communication device includes a fixed network node, such as a Base Station (BS), a macro BS, a pico BS, a relay node, a femto BS, or a home BS. The mobile communication device includes a communication node including mobility, such as User Equipment (UE) and a mobile station.

Furthermore, the station may include different communication devices existing in different communication systems. For example, a first station may include a communication node existing within an LTE system, and a second station may include a device supporting Bluetooth or an 802.11 WLAN system. Each of the stations includes a fixed or mobile communication device.

Hereinafter, the present invention proposes a an efficient Inter-Cell Interference Coordination (ICIC) scheme with consideration taken of not only ICI between nodes within heterogeneous networks within the homogeneous communication system in a wireless communication system, but also interference between network devices between heterogeneous communication systems into consideration.

For example, UE is a network node within LTE and LTE-A communication systems, and communication equipment (an ear microphone, a printer, and mouse) wirelessly connected to the UE through a Bluetooth method may become a communication system connected through an 802.11 method. Here, if pieces of communication equipment (devices) exist and spacing between the boundaries of frequency bands in heterogeneous communication systems is not sufficient, interference may be generated from a signal generated from each piece of the communication equipment. In-device Coexist (ICO) interference may be chiefly generated when spacing between the boundaries of system frequency band of the devices of heterogeneous communication system is not sufficient. The present invention proposes a detailed scheme capable of efficiently preventing the interference.

FIG. 1 is a diagram schematically showing a wireless communication system to which an embodiment of the present invention is applied.

The wireless communication systems are widely deployed in order to provide various communication services, such as voice and packet data.

Referring to FIG. 1, the wireless communication system includes pieces of UE 10 and a BS 20. Technology for determining preferred CCs, such as that to be described in the following embodiments, is applied to the UE 10 and the BS 20. In this specification, the UE 10 is a comprehensive concept that means UE in wireless communication and should be interpreted as a concept including not only UE in WCDMA, LTE, and HSPA, but also communication node having mobility, such as a Mobile Station (MS), a User Terminal (UT), a Subscriber Station (SS), and a wireless device in GSM.

In general, the BS 20 or a cell refers to a fixed station which communicates with the UE 10, and it may also be called another terminology such as node-B, an evolved Node-B (eNB), or a Base Transceiver System (BTS), an access point, or a relay node. Hereinafter, a base station is defined as an eNB.

That is, in the present invention, the eNB 20 or cell should be interpreted as a comprehensive meaning indicating some regions which are covered by a Base Station Controller (BSC) in CDMA and a NodeB in WCDMA, and it covers all various coverage areas of network nodes, such as mega cell, a macro cell, a microcell, a pico cell, a hot spot, a femto cell, and a relay node.

In the present invention, the UE 10 and the eNB 20 are two types of transmission and reception entities used to implement technology or the technological spirit described in this specification and are used as comprehensive meanings, but are not limited by terms or words which are specially designated.

Multiple access schemes applied to the wireless communication system are not limited. A variety of multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, and OFDM-CDMA, may be used.

In uplink transmission and downlink transmission, a Time Division Duplex (TDD) method of performing transmission using different times may be used or a Frequency Division Duplex (FDD) method of performing transmission using different frequencies may be used.

An embodiment of the present invention may be applied to the allocation of resources in fields, such as asynchronous wireless communication evolving into Long Term Evolution (LTE) and LTE-advanced through GSM, WCDMA, and HSPA and synchronous wireless communication evolving into CDMA, CDMA-2000, and UMB. The present invention should not be interpreted as being limited or restricted to specific wireless communication fields, but should be interpreted as including all technological fields to which the spirit of the present invention may be applied.

The wireless communication system to which an embodiment of the present invention is applied may support uplink and/or downlink HARQs, and it may use a Cannel Quality Indicator (CQI) for link adaptation. Furthermore, multiple access methods for downlink and uplink transmission may be different from each other. For example, downlink may use Orthogonal Frequency Division Multiple Access (OFDMA), and uplink may use Single Carrier-Frequency Division Multiple Access (SC-FDMA).

The layers of a radio interface protocol between UE and a network may be classified into a first layer L1, a second layer L2, and a third layer L3 which are the three lower layers of an Open System Interconnection (OSI) that is widely known in communication systems. A physical layer belonging to the first layer provides information transfer service using a physical channel.

Meanwhile, in an example of the wireless communication system to which an embodiment of the present invention is applied, one radio frame may include 10 subframes, and one subframe may include two slots.

A basis unit for data transmission is a subframe, and downlink or uplink scheduling is performed for each subframe. One slot may include a plurality of OFDM symbols in the time domain and at least one subcarrier in the frequency domain. One slot may include 7 or 6 OFDM symbols.

For example, if a subframe includes two time slots, each of the time slots may include 7 symbol in the time domain and 12 subcarriers in the frequency domain. The time-frequency region defined as one slot as described above may be called a Resource Block (RB), but not limited thereto.

Meanwhile, in one of the present communication systems, one carrier having a specific frequency bandwidth (a maximum of 20 MHz) is used. In this wireless communication system, System Information (SI) about one CC is transmitted and received through a relevant CC.

In a new communication system being recently discussed, the extension of a bandwidth is being discussed in order to satisfy required performance. In order to extend the bandwidth, a method of defining a unit carrier that may be included in the existing communication UE as a Component Carrier (hereinafter referred to as a 'CC') and the CCs are bundled and used by taking the extension of service coverage into consideration is being discussed.

In an LTE-A system, 5 CCs each having 20 MHz, in addition to a frequency band allocated for an LTE system, may be bundled and extended up to a bandwidth having a maximum of 100 MHz. Technology in which one or more CCs are bundled as described above is called a Carrier Aggregation (hereinafter referred to as a 'CA'). Here, for a CA, five or more available CCs may be used according to service extension. Furthermore, frequency bands allocated as CCs may be contiguous or non-contiguous.

Meanwhile, in relation to the CA technology, a plurality of CCs may be classified into three types: a backwards compatible carrier, a non-backwards compatible carrier, and an extension carrier.

The backwards compatible carrier (hereinafter referred to as a 'compatible carrier' or 'BC') is a carrier which may be applied to all pieces of UE having all the existing LTE versions, and it may be operated as a single (sole) carrier or as a part of a CA. In Frequency Division Duplex (FDD), a pair of uplink and downlink carries may always exist.

Meanwhile, the non-backwards compatibility carrier (hereinafter referred to as an 'NBC') is a carrier which may be operated single (solely) if the carrier is inaccessible to UE according to communication systems so far and is generated from a duplex distance and which may be operated as only part of a CA otherwise.

Furthermore, an extension carrier (hereinafter referred to as an 'ExC') is a carrier which cannot be operated single (solely), but is indispensably used as a part of a set of at least one CC which may be solely used. The ExC is a carrier used only as bandwidth extension.

Meanwhile, the BC or NBC may maintain a Radio Resource Control (RRC)_IDLE state or an RRC_CONNECTED state. In particular, in the RRC_CONNECTED state, the BC or NBC may be fully connected. Even in the RRC_IDLE state, some pieces of system information may be received, and a relevant carrier (CC or cell) may be accessed.

In this specification, an HetNet should be interpreted as a comprehensive meaning, including not only network nodes of a network in which systems of several communication methods are mixed, but also systems of the same communication method having network nodes of a network in which a cell structure consists of a plurality of layers.

Figure 2:
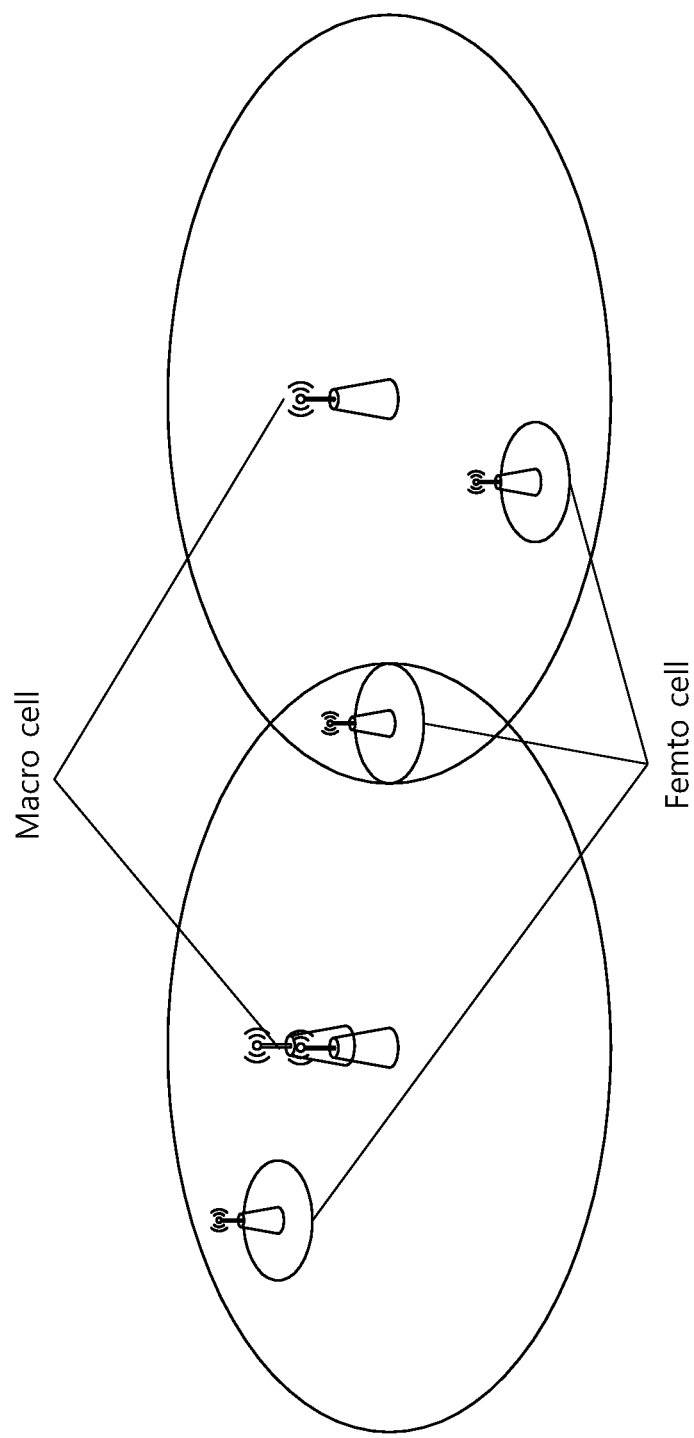
FIG. 2 shows an example of an HetNet to which the present embodiment may be applied.

FIG. 2 shows an example of an HetNet to which the present embodiment may be applied.

FIG. 2 shows an HetNet system including nodes or cells having various coverages. Network nodes forming the system may include a macro cell having a long coverage and a femto cell having a short coverage which exists within the coverage of the macro cell.

In the present invention, a femto cell is used to generally refer to all cells or network nodes, such as a microcell, a pico cell, a hot spot, a femto cell, and a relay node which has a smaller coverage than a macro cell, and thus should be interpreted as a wider meaning than a common meaning. Furthermore, a femto cell corresponds to the coverage of a femto eNB or a home eNB. In general, femto cells, from among network nodes, have a narrower service coverage than a macro cell owing to limited transmit power. Here, restricted time resources or frequency resources are applied to cells, such as a femto cell or a pico cell having lower priority in band allocation than a macro cell. Accordingly, the macro cell is considered as an aggressor cell, and the femto cell or pico cell to which restrictions are applied is considered as a victim cell.

FIG. 3 shows an example of CCs which may be used in the present invention.

Referring to FIG. 3, each CC is defined as a maximum of 20 MHz. Each CC is one of the three types; the BC, the NBC, and the ExC. A femto cell having a narrow RF coverage may also be operated in the CA mode of an LTE-A system, and it may additionally use a plurality of CCs according to circumstances.

Accordingly, 1) in each cell, UE may a set of UE-specific CCs, 2) Radio Resource Control (RRC) connection is performed through one of a set of configured CCs, 3) the CCs may be distinguished from each other by a carrier indicator having 3 bits. Meanwhile, the carrier indicator may be represented by a length of 8 bits in a field determined based on each CC in a 1 to 1 manner.

Accordingly, the above-discussed contents may also be likewise applied to the femto cell. Accordingly, it can be known that UE served by the femto cell may configure a set of UE-specific CCs.

A femto cell taken into consideration in this HetNet has limited service coverage as in FIG. 3 because limited transmit power. Thus, from a viewpoint of a femto cell, ICI must be coordinated and the problem must be solved in order to increase transmission efficiency.

Furthermore, since there is a possibility that the ICI ratio of a femto cell may be suddenly changed by various environment factors of a macro cell, ICIC is a factor that is directly related to the performance of the femto cell.

Furthermore, as shown in FIG. 3, interference from a macro cell may be different for each CC because a maximum of five CCs each having a maximum of a 20 MHz bandwidth can be used in each system at the same time. Furthermore, there is a possibility that procedures, such as a frequent change of CCs or the reallocation of resources, have to be performed for each carrier in UE that is served by a femto cell.

Furthermore, in LTE-A, CCs may be defined to be contiguous or non-contiguous owing to a structural characteristic that CCs may be added according to circumstances. Accordingly, a propagation characteristic may be different for each CC because the center frequency and a set bandwidth may be different for each CC.

FIG. 4 is a diagram showing a different coverage for each CC to which the present invention is applied.

FIG. 4 shows that service coverage is different for each CC. Accordingly, when link is set up between a femto cell and UE, an ICI environment may be suddenly changed because the position of a femto eNB and the propagation characteristic of each of CCs included in a configured CC set are different.

In some communication system, such as LTE, if link between a femto eNB and UE is first set up, the UE sets up the link by selecting one of previously visited allowed Closed Subscribed Group (CSG) cells through autonomous search. In a communication system using a plurality of CCs, however, femto cell requires this CC configuration procedure because the CC configuration procedure is additionally necessary.

Furthermore, a femto cell may perform a series of the same procedures because a macro cell can reconfigure UE-specific CCs. If a femto cell is operated in a communication system using a plurality of CCs by taking this situation into consideration, an ICI problem may be generated. The problems may be summarized into several types as follows.

First, there is a factor to change ICI in a macro cell. More particularly, interference may be generated between macro cells because of a different configuration of a CC set in each UE, a different load factor (the number of users for each CC or the frequency band occupation ratio of users for each), and a propagation characteristic for each CC.

Second, there is a factor to change ICI in a femto cell. More particularly, for example, interference is generated between femto cells because of a different CC set in each UE, limited transmit power of a femto eNB (Here, maximum transmit power is limited within a specific range and the transmit power can be adjusted within the relevant range), and a different propagation characteristic for each CC.

Accordingly, in order to solve the ICI problem in an HetNet, there is a need for a method capable of controlling ICI using a plurality of CCs.

Furthermore, if a plurality of CCs, for example, a maximum of 5 CCs is used at the same time in an LTE-A system, interference from a macro cell may be different for each CC. Accordingly, there is a high possibility that UE served by a femto eNB may perform procedures of frequently changing CCs or reallocating CCs owing to the interference from the macro cell. As a result, it can be seen that various scenarios taken into consideration in a femto cell are associated with Inter-Cell Interference Coordination (ICIC). Thus, there is a need for a new method capable of solving the ICI problem through a UE-specific CC configuration with consideration taken of interference between communication cells using a plurality of CCs.

Accordingly, the present invention includes a construction for receiving use information about each of CCs of one or more first cells neighboring the second cell and determining preferred CCs to be used by the second cell based on received priority for each CC as a method of determining a preferred CC set to be used by a second cell which is included in the coverages of the one or more first cell in this HetNet system.

More particularly, the use information about each CC is detailed use information about each CC, including one or more of coverage information about each of CCs of the neighboring first cell, load factor information about each of CCs of the neighboring first cell, and information about supported CCs. The preferred CCs may be determined by assigning priority of CCs by using a first method of assigning priority in the sequence of shorter coverage if received use information about each CC is service coverage information, a second method of assigning priority in the sequence of lower load factors if the received use information about each CC is a load factor for each CC, and a third method of assigning priority to the non-supported CC of the first cell if the received use information about each CC is information about whether a CC is a supported CC or not and by determining the preferred CCs based on the assigned priority.

Furthermore, the use information about each CC is priority information about each CC for each of the first cells, and the preferred CCs may be determined based on the priority information about each CC.

In this specification, a cell is used as a concept equivalent to terms, such as a station, a network node, a macro cell, and a femto cell, a plurality of cells may be the cells of homogeneous communication systems or the cells of heterogeneous communication systems. However, it should be understood that the present invention is not limited to the common meanings of the terms, but generally refers to all or some of the communication factors of various coverages.

In other words, in the present invention, a macro cell or a macro BS is assumed and described as an example of a first cell or a first station, and a femto cell or a femto eNB is assumed and described as an example of a second cell or a second station. However, the present invention is not limited thereto and may also be applied to a communication environment in which the cells/stations of a communication system having homogeneous networks using various CCs or the devices of communication systems having heterogeneous networks are mixed.

Figure 5:
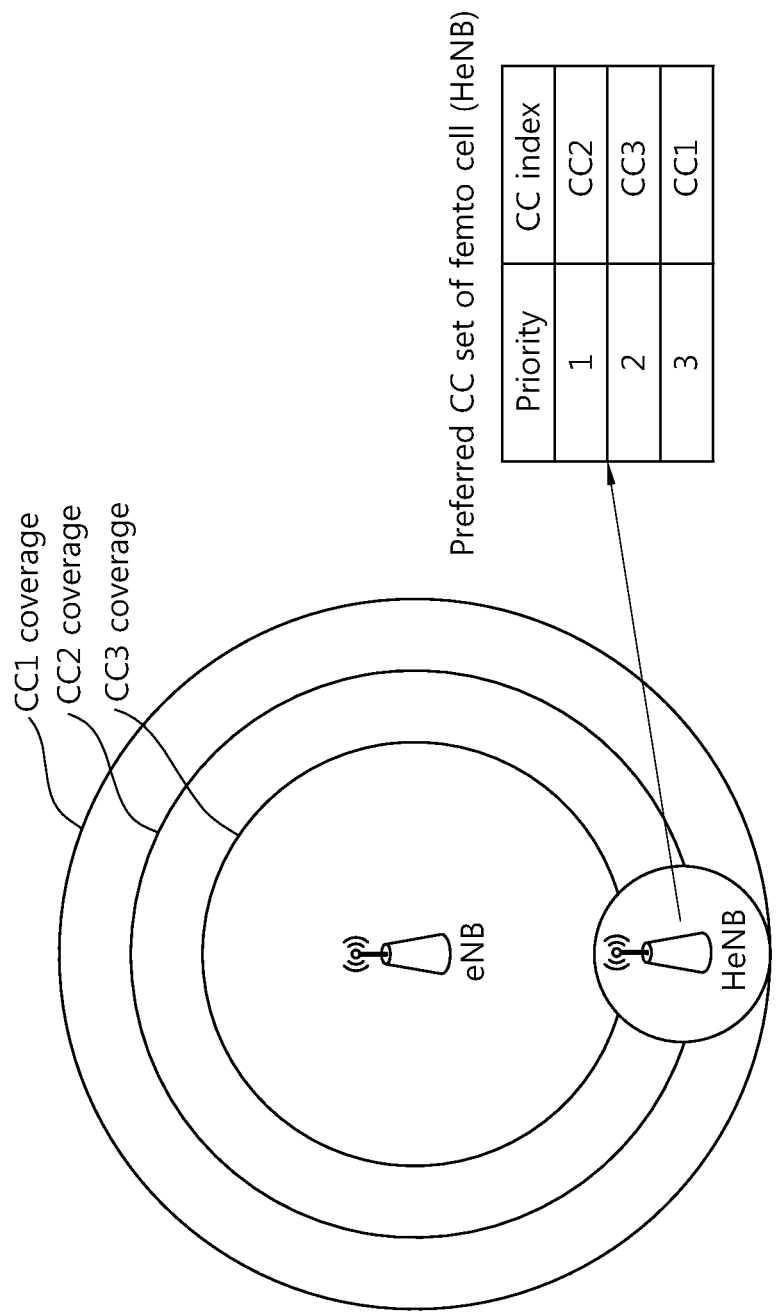
FIG. 5 is a diagram illustrating a concept that a preferred CC set is configured by taking service coverage into consideration according to the present invention.
Figure 6:
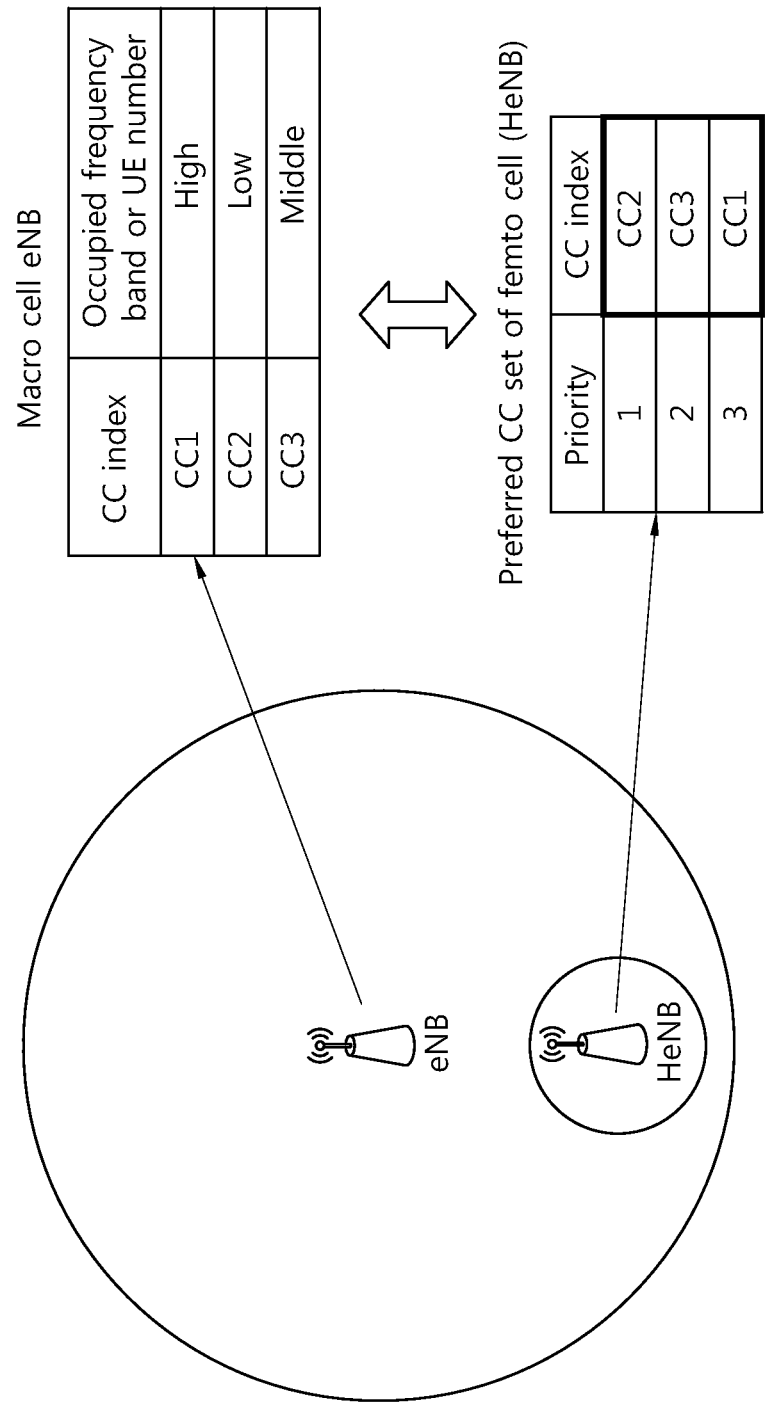
FIG. 6 is a diagram illustrating a concept that a preferred CC set is configured by taking load factors into consideration according to the present invention.

FIGS. 5 to 7 are diagrams illustrating the concept or principle of each of the first method to the third method which are applied in order to determine the preferred CC set of the second cell (femto cell) based on use information about each of CCs of the first cell (macro cell) according to the present invention.

First, FIG. 5 is a diagram illustrating a concept that a preferred CC set is configured by taking service coverage into consideration according to the present invention.

Referring to FIG. 5, in the first method of the present invention, the preferred CCs of the second cell is selected by taking the sequence of CCs having longer coverage into consideration, from among a plurality of CCs configured in the first cell. The femto cell may be placed in an area where ICI from the macro cell is great although the area may vary according to the position of the macro cell. For this communication environment, cross-carrier scheduling may be applied.

In an embodiment of the present invention, the preferred CC set of a femto cell may be configured by using different service coverage which may occur owing to the different propagation characteristics of CCs. That is, interference from a macro cell may be avoided at a specific probability according to the position of a femto cell eNB by primarily using CCs having shorter service coverage of the macro cell in the femto cell.

For example, in FIG. 5, the coverage of a CC3 is the shortest and the coverage of a CC1 is the longest, from among CCs configured in a macro cell (eNB).

Accordingly, a femto cell (HeNB) configures a preferred CC set using priority of a CC configuration in order of CC3→CC2→CC1.

Meanwhile, in use information about each CC of a macro cell, service coverage may be defined by the following three types of methods, but not limited thereto.

First, there is a method of defining service coverage using the same SINR-based distribution region information of a macro cell. Here, the eNB of a macro cell may estimate a long-term averaged SINR distribution by using position-based SINR information about UE.

Second, a service coverage region may be defined using a transmission power attenuation distribution.

Third, service coverage region may be defined using Channel Quality Index (CQI) information and position information about UE which are reported to the eNB of a macro cell.

FIG. 6 is a diagram illustrating a concept that a preferred CC set is configured by taking load factors into consideration according to the present invention.

Referring to FIG. 6, in the second method of the present invention, the preferred CCs of the second cell is selected in the sequence of lower load factors, from among a plurality of CCs configured in the first cell.

For example, in an LTE-A system supporting a Carrier Aggregation (CA), a plurality of CCs (e.g., 5 CCs) may be used at the same time, but users are not always uniformly distributed in all the CCs. That is, the UEs of a macro cell may be concentrated on a specific CC or distributed according to circumstances. Furthermore, if a specific CC is configured as a Backward-compatible Carrier (BC) and is a CC both accommodating the existing LTE UE and LTE-A UE at the same time, a relative greater number of UEs may be concentrated as compared with a Non-backward compatible Carrier (NBC) and an extension carrier.

Furthermore, if an allocated frequency band is great because a transfer rate requested by specific UE is high, a load factor may be different for each CC. As a result, the number of UEs using a relevant CC is many as the load factor is higher and they may occupy a greater frequency band. Accordingly, a femto cell may be greatly influenced by interference from the CCs of a macro cell having a relatively higher load factor.

Accordingly, if the preferred CC set of a femto cell (HeNB) is configured in order of lower load factors from among CCs configured in a macro cell (eNB), interference from the macro cell can be relatively lowered. Thus, in the example of FIG. 6, if a CC1 has the highest load factor, a CC2 has the lowest load factor, and a CC3 has a middle load factor from among CCs configured in a macro cell (eNB), a femto cell (HeNB), the preferred CC set is determined in order of CC2→CC3→CC1 in the sequence of lower load factors.

Here, the load factor for each of CCs configured in the macro cell may be defined by using one or more of the number of UEs now distributed for each CC, the size of a frequency band now used by each CC, and the transfer rate now measured for each CC, but not limited thereto. The load factor may be defined by taking other factors into consideration.

FIG. 7 is a diagram illustrating a concept that a preferred CC set is configured by taking whether service is supported into consideration according to the present invention.

Referring to FIG. 7, in the third method of the present invention, CCs not supported in the first cell, from among a plurality of CCs, are primarily selected as preferred CCs.

For example, it is assumed that a maximum of 5 CCs are available in an LTE-A system supporting a CA. Here, an eNB may be configured to determine the number of CCs that may be accommodated according to the number of users or traffic load and provide communication service. For example, an eNB may expand a service area by using 8 CCs.

Furthermore, an eNB may support only a specific number of CCs by taking the traffic load of a system into consideration. Furthermore, an eNB may increase the number of supported CCs by taking the traffic load of a system into consideration. Here, as a method of increasing supported CCs, the supported CCs may be randomly increased or may be increased according to a determined sequence.

If, as described above, CCs supported by a macro cell are limitedly configured, the macro cell may send information about supported CCs or non-supported CCs to a femto eNB.

Here, since a macro eNB may determine CCs supporting communication in specific sequence or randomly according to traffic load, CCs supporting communication may be the same or different for each macro eNB. Accordingly, CCs not supporting communication for each macro eNB are seen as zero power CCs in a femto cell because link with UE is not set up.

Accordingly, if the non-supported CCs from among the CCs of a macro cell are primarily defined as the preferred CC set of a femto cell, interference from the macro cell can be relatively lowered.

In the example of FIG. 7, if a macro cell (eNB) uses a CC1, a CC4, and a CC5 as supported CCs and a CC2 and CC3 are non-supported CCs not used by the macro cell, the non-supported CCs CC2 and CC3 become CCs without ICI for a femto cell (HeNB). Accordingly, the femto cell (HeNB) may primarily configure the CC2 or CC3 as a preferred CC set.

Figure 8:
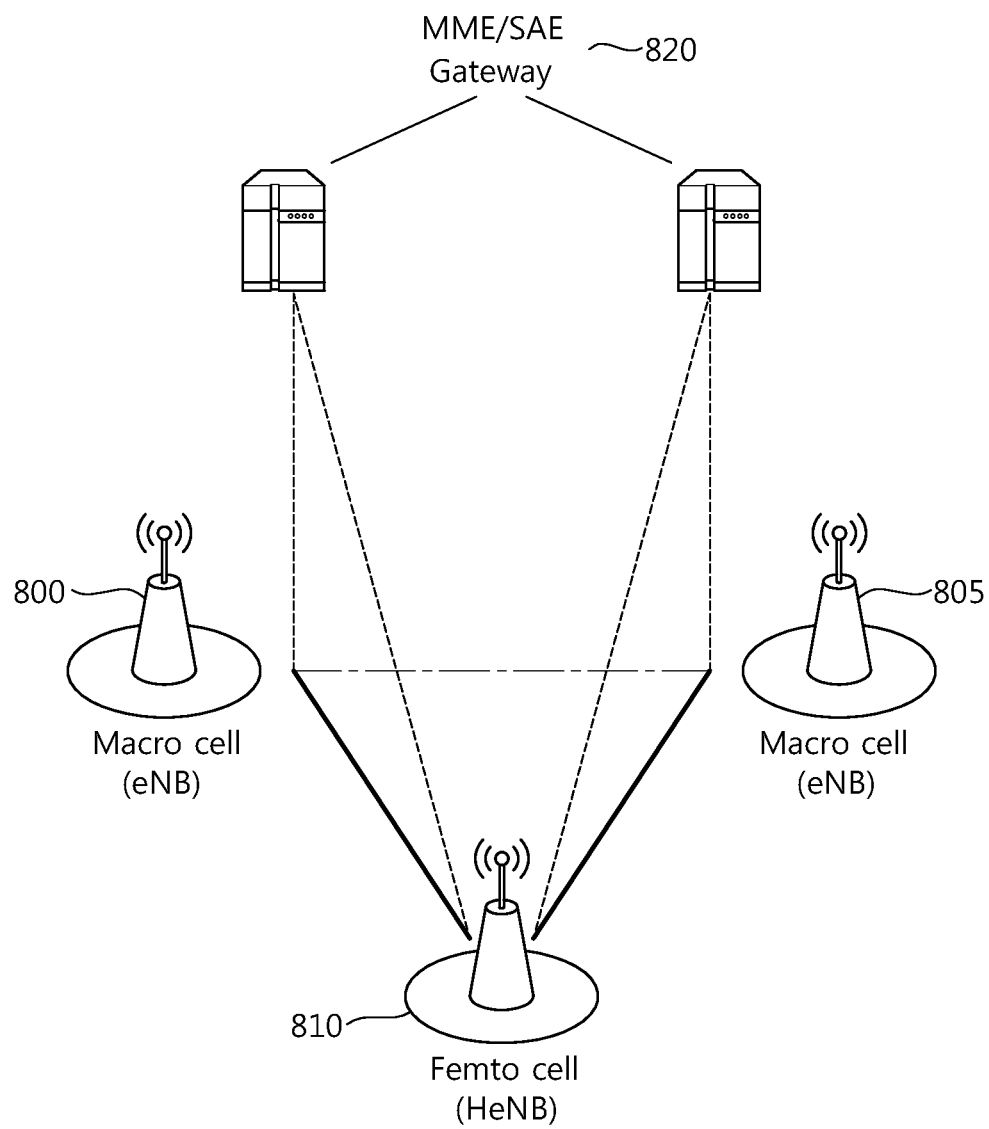
FIG. 8 shows an example of an HetNet system configuration to which the present invention is applied.

FIG. 8 shows an example of an HetNet system configuration to which the present invention is applied.

The HetNet system shown in FIG. 8 includes two eNBs 800 and 805 as macro cells which are examples of a first cell or a first network node, a home eNB (HeNB) 810, that is, a femto eNB which is an example of a second cell or a second network node existing within the coverage of the two eNBs, and an MME/SAE gateway 820, that is, a core network node capable of communicating with the eNB or the HeNB through an S1 interface.

The core network is not limited to the eNBs, the HeNB, and the MME/SAE gateway of FIG. 8, and may have another core network in addition to the MME/SAE gateway. For example, the HeNB 810 may be connected to a core network (MME/SAE gateway) using, for example, HTTP, that is, the Internet network, and pieces of use information about each of CCs transmitted by eNBs, that is, macro cells may be transferred to the HeNB through the S1 interface as in FIG. 8 or through direct communication. Furthermore, an X2 interface may exist between the eNBs. Here, the direct communication includes that broadcasting information from the macro cell (eNB) is transmitted to the HeNB.

Two types of communication methods may be possible between the eNBs 800 and 805, that is, macro cells (eNB) and the HeNB 810, that is, a femto cell as follows.

First, CC information is received from a macro eNB including a relevant cluster eNB through a gateway and MME over a local eNB and a specific server. A femto cluster may receive information about CCs from the gateway or the server in a wired manner because it is connected to a LAN.

Second, use information about each of CCs configured in a macro cell may be included in broadcasting information transmitted by an eNB and then transmitted. In this case, additional resource allocation is necessary for an eNB, and an HeNB must have a device or functional procedure capable of listening to the broadcasting information of the macro cell.

A transfer method through UE must be used because an interface, such as that shown described above does not exist between heterogeneous systems. For example, the information may be transferred from equipment using a WLAN or Bluetooth to UE, and the UE may transfer the information to a macro eNB, and the vice versa.

In the first method to the third method described above with reference to FIGS. 5 to 7, a macro cell may send detailed use information about each CC to a femto cell, the femto cell may determine its own preferred CC set based on the detailed use information about each CC, and the macro cell may determine priority for each CC in accordance with the first method to the third method and transmit only priority information about each CC to the femto cell directly or through another network node.

In the present invention, "use information about each CC" transferred from a macro cell to a femto cell or a preferred CC set processing apparatus is a concept, including "detailed use information about each CC", such as service coverage information about each CC, load factor information, and supported/non-supported CC information, and "priority information about each CC" which is determined by a macro cell and which means priority for each CC which is determined by one of more of the first method to the third method.

In an embodiment of the present invention, when a macro cell transmits "detailed use information about each CC" to a femto cell or a preferred CC set processing apparatus, the femto cell or the preferred CC set processing apparatus may determine the preferred CC set of a relevant femto cell based on the detailed use information about each CC. This is referred to as a first embodiment in this specification.

Furthermore, unlike in the first embodiment, a macro cell may determine priority for each CC which is suitable for a specific femto cell, calculate priority information about each CC, and transfer the calculated priority information to a femto cell or a preferred CC set processing apparatus. This is referred to as a second embodiment in this specification.

That is, a preferred CC set determination apparatus for determining the preferred CC set of a specific femto cell according to one or more of the first method to the third method may be implemented in a femto cell, but not limited thereto. The preferred CC set determination apparatus is implemented in a server level, that is, a higher element of the femto cell. Here, the server level refers to some of elements of a core network which determines the preferred CC set of a femto cell based on information transmitted by a macro cell, and is not limited to a specific element.

Furthermore, the preferred CC set determination apparatus may receive "detailed use information about each CC", such as service coverage information about each CC, load factor information, and supported/non-supported CC information, directly determine priority for each CC, and then determine a final preferred CC set, but may perform a function of receiving priority information about each CC which means priority for each CC, determined by a macro cell according to one or more of the first method to the third method, and then determine a final preferred CC set based on the priority information.

In accordance with the second embodiment, for example, if service coverages of three CCs used in a macro cell are measured in order of CC1>CC>CC3, only the sequence of service coverages of the three CCs may be transmitted to a femto cell eNB as priority information about each CC. More particularly, this may be implemented as in the following example.

First, if the service coverages of CCs of a macro cell are determined as CC1>CC2>CC3, the macro cell sorts indices for the CCs. Here, the CC may have the index of 3 bits, and a CC having the shortest service coverage of the macro cell has priority in which the CC is used in a femto cell eNB (HeNB). Accordingly, the transmission orders of the CCs are sorted through the CC indices. For example, if the CC1 index is defined as 001, the CC2 index is defined as 010, and the CC3 index is defined as 011, the CCs are sorted in order of CC3-CC2-CC1.

After the CC indices are sorted, as a preferred CC set to be used as the femto cell, for example, as a preferred CC set for the femto cell, the macro cell sends CC3-CC2-CC1, that is, '011 010 001' to the femto eNB or a preferred CC set processing apparatus as priority information about each CC.

As described above, in the first embodiment and the second embodiment, a femto cell eNB or the preferred CC set determination apparatus of a server level determines priority for each CC of a specific femto cell based on use information about each received from each macro cell (detailed use information about each CC or priority information about each CC) and determines a preferred CC set by randomly assigning priority to some areas.

That is, in the present embodiment, a principle that the preferred CC set of a femto cell is determined using use information about each CC, received from a macro cell, may be summarized as follows.

1) CCs having shorter service coverage, from among CCs used in a macro cell, are given priority.

2) CCs having lower load factor, from among CCs used in a macro cell, are given priority. In this method, it is assumed that all the CCs may not always have the same load factor and a specific CC may not have any link set up with UE.

3) Non-supported CCs whose use by a macro cell is limited are given priority. On the assumption that the eNB of a macro cell does not use all CCs for a specific reason and may control the number of supported CCs by taking a communication environment into consideration, a specific CC is assumed to be a non-supported CC, and the non-supported CC is configured as the preferred CC set of a femto cell.

Figure 9:
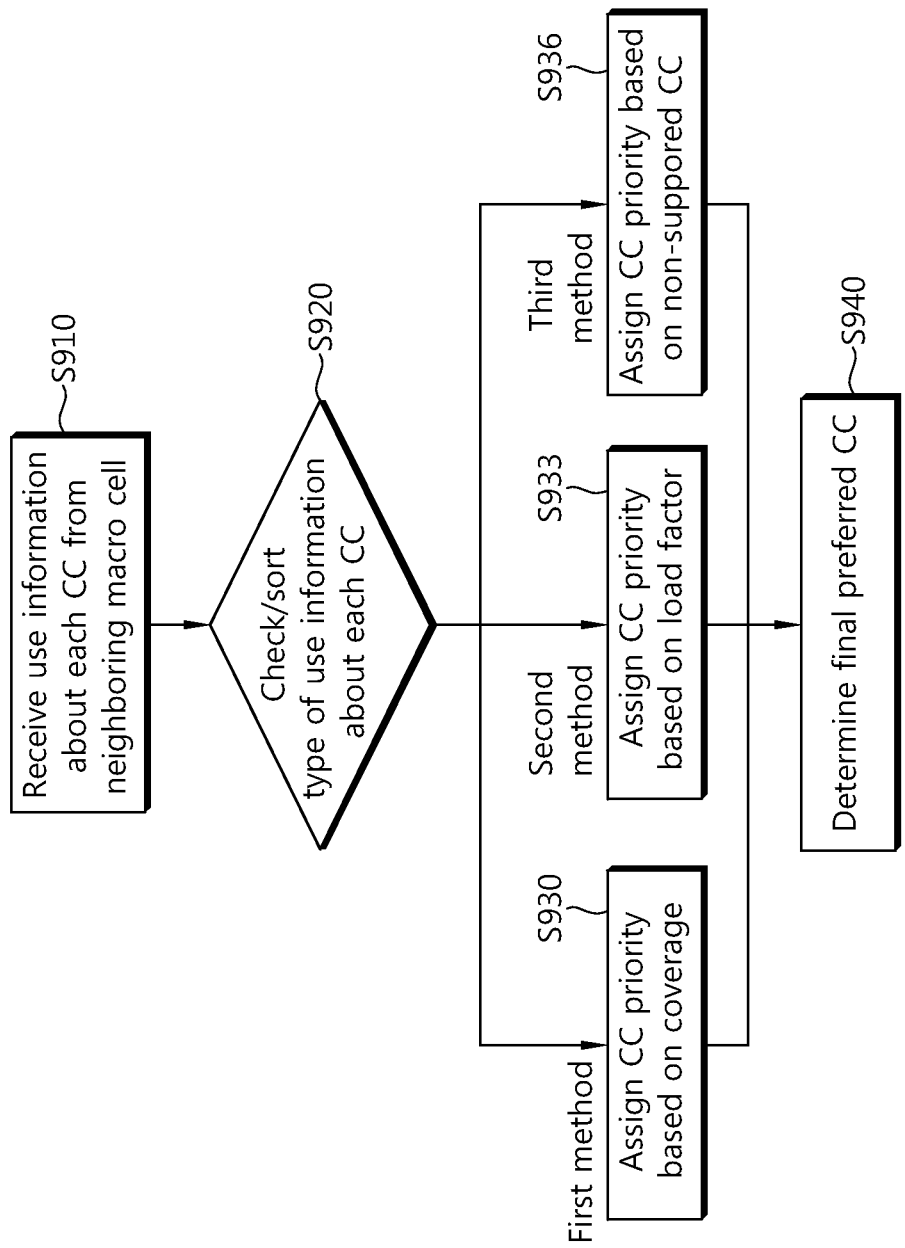
FIG. 9 shows a flowchart of determining a preferred CC set according to the present invention.

FIG. 9 shows a flowchart of determining a preferred CC set according to the present invention. In particular, when the number of macro cells is 1, the preferred CC set of a specific femto cell is determined. The present embodiment relates to a method of determining preferred CCs to be used by a second cell which are included in the coverages of one or more first cells by using a preferred CC set determination apparatus. The method includes receiving one or more pieces of use information about each CC of the first cell neighboring the second cell and determining a preferred CC to be used by the second cell based on the received use information about each CC.

More particularly, as shown in FIG. 9, a femto cell or a preferred CC set determination apparatus implemented within a server level receives use information about each of CCs of one or more macro cells neighboring a specific femto cell (S910).

The type of the received use information about each CC is determined and the pieces of use information about CCs are sorted according to the type (S920). Here, the type of the use information about each CC means the type of use information about each CC used in the first method to the third method. More particularly, the type of the use information about each CC may become detailed use information about each CC, such as service coverage information about each CC, load factor information about each CC, and information about supported/non-supported CC and may become priority information about each CC which has been previously determined by the first method to the third method.

Next, the preferred CC set determination apparatus coordinates or checks (S930, S933, and S936) of priority of CCs to be used in the femto cell according to the type of the received use information about each CC and determines a final preferred CC set (S940).

The process of checking the type of the use information about each CC or the process of sorting the pieces of use information about each CC according to the type may be omitted according to circumstances, such as that the type of a piece of use information about each CC is used.

The process of coordinating priority of the CCs according to the type of the received use information about each CC is described in more detail below. If the received use information about each CC of the macro cell is service coverage information, priority is given in order of CCs having a shorter coverage (S930). If the received use information about each CC of the macro cell is load factor, priority is given in order of lower load factor (S933). If the received use information about each CC of the macro cell is information about whether a CC is a supported CC, priority is given to the non-supported CCs of the relevant macro cell (S936).

After priority is given, a final preferred CC set is determined based on the priority (S940).

In the process S940, there may be CCs having the same priority according to circumstances. In this case, priority of CCs may be given randomly or in order of indices, and the preferred CC set may be finally determined.

Furthermore, several algorithms for determining which of the first method to the third method will be primarily applied if several types of pieces of use information about each CC are received, and for determining a preferred CC set when CC priority is different in each of the methods may be possible.

In the present invention, a "preferred CC set" refers to a set of one or more CCs suitable for being allocated to the second cell, but is not necessarily limited to the meaning "set". The preferred CC set has the same concept as "preferred CC", that is, one or more CCs having higher priority.

The method of determining a preferred CC set, such as that shown in FIG. 9 is described by taking an example. If pieces of use information about each CC received from a macro cell are the same as listed in Table 1, it is assumed that priority according to the first method is CC3→CC2→CC1, priority according to the second method is CC3→CC1→CC2, and priority according to the third method is CC4, CC5→CC1, CC2, CC3.

TABLE 1

|  | COVERAGE (FIRST TYPE) | LOAD FACTOR (SECOND TYPE) | SUPPORTED CC (THIRD TYPE) |
| --- | --- | --- | --- |
| CC #1 | Large | Middle load | Supported CC |
| CC #2 | Middle | Great load | Supported CC |
| CC #3 | Small | Small load | Supported CC |
| CC #4 | — | — | Non-supported CC |
| CC #5 | — | — | Non-supported CC |

In the above example, whether which method will be primarily applied may be implemented in various ways. For example, non-supported CCs may be primarily allocated to a preferred CC set by primarily applying the third method. Next, priority may be determined by applying the second method or the first method.

If, as described above, the preferred CC set is determined, priority of CCs to be allocated to a relevant femto cell will become CC4, CC5→CC3→CC1 or CC2, and thus the preferred CC set of the relevant femto cell may be determined as CC4, CC5, and CC3. Relevant CCs according to specific order in the determined preferred CC set may be configured as the CCs of the femto cell. This is only illustrative, and a final preferred CC set may be determined according to other methods based on pieces of use information about each CC having several types.

Furthermore, FIG. 9 shows an example in which the preferred CC set determination apparatus receives coverage information of a first cell, load factor information, and information about supported CCs, directly determines priority of the CCs, and then determines a final preferred CC set. According to the second embodiment, however, the preferred CC set determination apparatus receives priority information about each CC of a first cell from the first cell or another network element and then immediately determine a preferred CC set.

The method of determining a preferred CC, such as that described with reference to FIG. 9, may be applied between eNBs which control an aggressor cell and a victim cell. The eNB which controls the aggressor cell is referred to as a aggressor BS, and the eNB which controls the victim cell is referred to as a victim eNB (victim BS). A probability that an eNB may become an aggressor eNB is relatively high according to an increase of CC allocation priority, and a probability that an eNB may become a victim eNB is relatively high according to an decrease of CC allocation priority. For example, if interference due to CCs is generated between a macro eNB and a femto eNB, the macro eNB becomes an aggressor BS and the femto eNB becomes a victim BS. In interference control as described above, an aggressor BS and a victim BS are relatively determined between eNBs.

For example, if UE exists within the coverage of a femto eNB, but does not belong to a relevant femto and belongs to only a macro eNB, a probability that the CC allocation priority is performed on the basis of the femto eNB may rise. Here, the macro eNB may become a victim eNB, and the femto eNB may become an aggressor eNB.

The method of determining a preferred CC set, such as that described with reference to FIG. 9, may be applied to the devices or stations of heterogeneous communication system. For example, an environment in which an eNB and UE configure multiple CCs is assumed. If the first station of a first communication system and the second station of a second communication system are connected to UE, a preferred CC set may be used in order to prevent the system frequency band of the first station and the second station from overlapping with each other. For example, for the first station, a first preferred CC set including a CC1 and a CC2 may be determined. For the second station, a preferred CC set including a CC3 and CC4 may be determined.

In particular, in accordance with the first and the second embodiments, the subject that determines a preferred CC set may be the first or second station. In accordance with the third embodiment, the subject that determines a preferred CC set may be the UE. Furthermore, the UE may send information about the preferred CC set to the eNB as statistics between the devices of the heterogeneous communication system.

Figure 10:
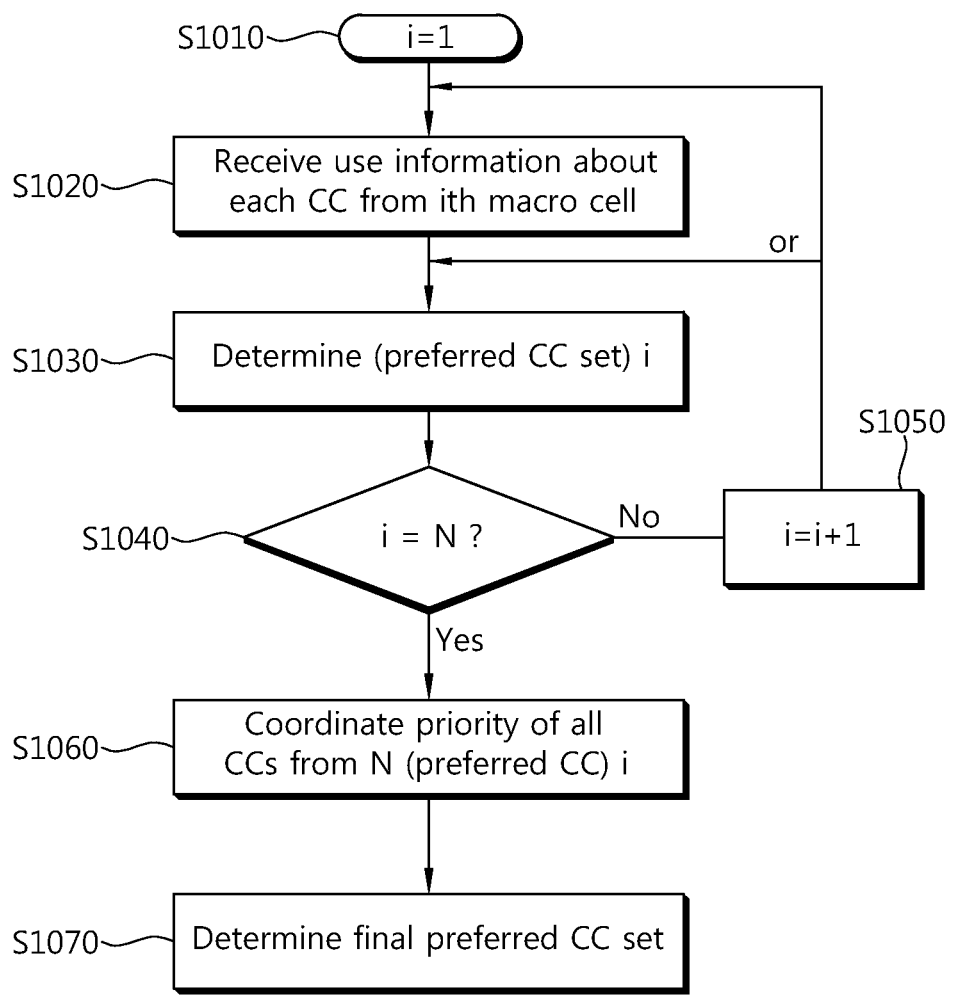
FIG. 10 shows a flow of determining a preferred CC set based on received use information about each CC according to the present invention.

FIG. 10 shows a flow of determining a preferred CC set of a femto cell after receiving use information about each CC from two or more macro cells according to the present invention.

If pieces of use information about each CC are received from two or more macro cells as in FIG. 10, first, i=1 is started (S1010), and use information about each CC is received from to an $i^{th}$ macro cell (S1020). A preferred CC set i (a preferred CC set) for the CCs of the first macro cell is determined and stored (S1030).

Next, whether i=N is determined (S1040). If i<N, the i value is increased by 1 and proceeds to the steps S1020 or S1030 (S1050). Here, N refers to the number of all macro cells neighboring a relevant femto cell.

If i=N, that is, the preferred CC set i for each of all neighboring macro cells within the coverage of the femto cell is determined, all the priority of CCs are controlled on the basis of N (preferred CC sets) i values (S1060), and a final preferred CC set is determined based on the controlled priority (S1070).

For example, if all the neighboring macro cells have configured a specific CC as non-supported CCs, a preferred CC set may be determined by primarily allocating the relevant CC to the femto cell and giving priority to a CC having the lowest coverage or load factor, from among CCs configured in all the macro cells.

If the above determination method is applied to the devices of heterogeneous network systems, the subject that sends use information about each CC may be UE, and the subject that receives use information about each CC and determines a preferred CC set may be devices communicating with the UE.

Figure 11:
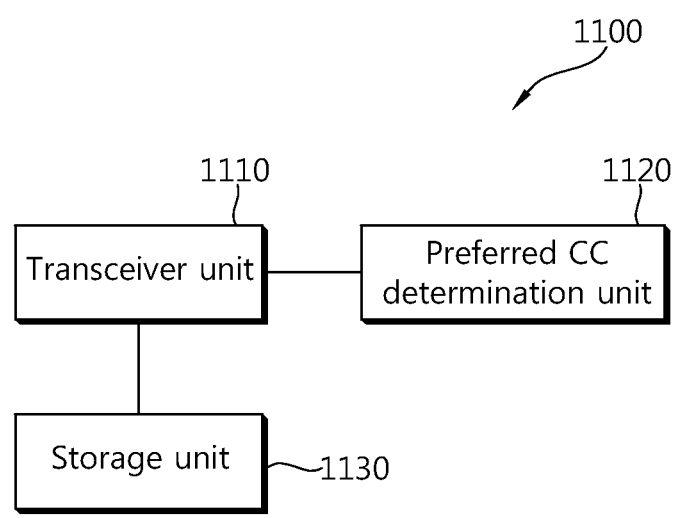
FIG. 11 shows a functional block diagram of a preferred CC set determination apparatus according to an embodiment of the present invention.

FIG. 11 shows a functional block diagram of a preferred CC set determination apparatus according to an embodiment of the present invention. If the CC set determination apparatus is applied to the devices of heterogeneous network systems, the CC set determination apparatus may be a device communicating with UE or the element of the device.

Referring to FIG. 11, the preferred CC set determination apparatus 1100 is an apparatus for determining a preferred CC set to be used by a second network node which is included in the coverage of a first network node. The preferred CC set determination apparatus includes a transceiver unit 1110 for receiving use information about each CC from one or more first network nodes and for receiving one or more of a request for at least one CC reconfiguration based on a preferred CC set, a request for resource allocation for at least one CC to be used, and a request to change a preferred CC from UE and a preferred CC determination unit 1120 for determining a preferred CC set to be used by the second network node based on the received use information about each CC. Here, the transceiver unit 1110 further performs a function of sending the preferred CC set, determined by the preferred CC determination unit 1120, to the UE. Furthermore, the preferred CC set determination apparatus 1100 may further include a storage unit 1130 for storing priority information about CCs about each of the first network nodes according to circumstances.

Furthermore, the preferred CC set determination apparatus 1100 may be included within a femto eNB, that is, the second network node, but not limited thereto. The preferred CC set determination apparatus 1100 may be implemented within a macro cell or eNB, that is, the first network node or an MME/SAE, a gateway, or another server, that is, another core network.

Furthermore, the preferred CC set determination apparatus 1100 is a first station as the first network node and may include an apparatus for determining a preferred CC set to be used by a second station which is an eNB of an LTE system and included in the coverage of the first station. Here, the second station may be a device which support Bluetooth or 802.11 a WLAN system.

The preferred CC set determination apparatus 1100 includes the transceiver unit 1110 for receiving use information about each CC from a first station and the preferred CC determination unit 1120 for determining a preferred CC set to be used by a second station node based on the received use information about each CC. The preferred CC set determination apparatus 1100 may further include the storage unit 1130 for storing priority information about CCs for each of the first stations according to circumstances. In the following description, it is assumed that a first network node includes a first station and a second network node includes a second station.

The preferred CC determination unit 1120, as described with reference to FIGS. 5 to 10, may determine a preferred CC set allocated to the second network node according to one or more of a first method of selecting a preferred CC in order of CCs having a shorter coverage from a plurality of CCs configured in the first network node, a second method of selecting a preferred CC in order of a lower CC load factor from the plurality of CCs configured in the first network node, and a third method of primarily selecting non-supported CCs not supported by the first network node, from among the plurality of CCs, as preferred CCs.

Furthermore, the "use information about each CC" is a concept, including "detailed use information about each CC", such as service coverage information about each CC, load factor information, supported/non-supported CC information, and "priority information about each CC", meaning priority for each CC which is determined by a macro cell by using one or more of the first method to the third method.

If use information about each CC is "detailed use information about each CC", the preferred CC determination unit 1120 receives "detailed use information about each CC" from a first network node, directly determines priority for each CC, and then determines a final preferred CC set. Meanwhile, if use information about each CC is "priority information about each CC", the preferred CC determination unit 1120 may perform only a function of receiving "priority information about each CC" from a first network node and determining a final preferred CC set based on the "priority information about each CC".

Furthermore, the transceiver unit 1110 of the preferred CC set determination apparatus further performs a function of sending the determined preferred CC set information to a reception apparatus. That is, the preferred CC set determination apparatus 1100 may select a method of signalizing preferred CC set information or priority information about each CC which has been determined by itself or received from the outside and send the preferred CC set information or the priority information about each CC to UE using the selected signaling method. The priority information about each CC is used in order to remove or control interference occurring owing to a collision between CCs when the cell of a second station is included in the cell coverage of a first station in a multiple component carrier system. Priority information about each CC is referred to as information for Interference Coordination (IIC) simply interference coordination information. For the integrity of description hereinafter, interference coordination information is used.

Furthermore, a signaling method according to the present embodiment may be either dedicated signaling or RRC signaling, but not limited thereto.

Figure 12:
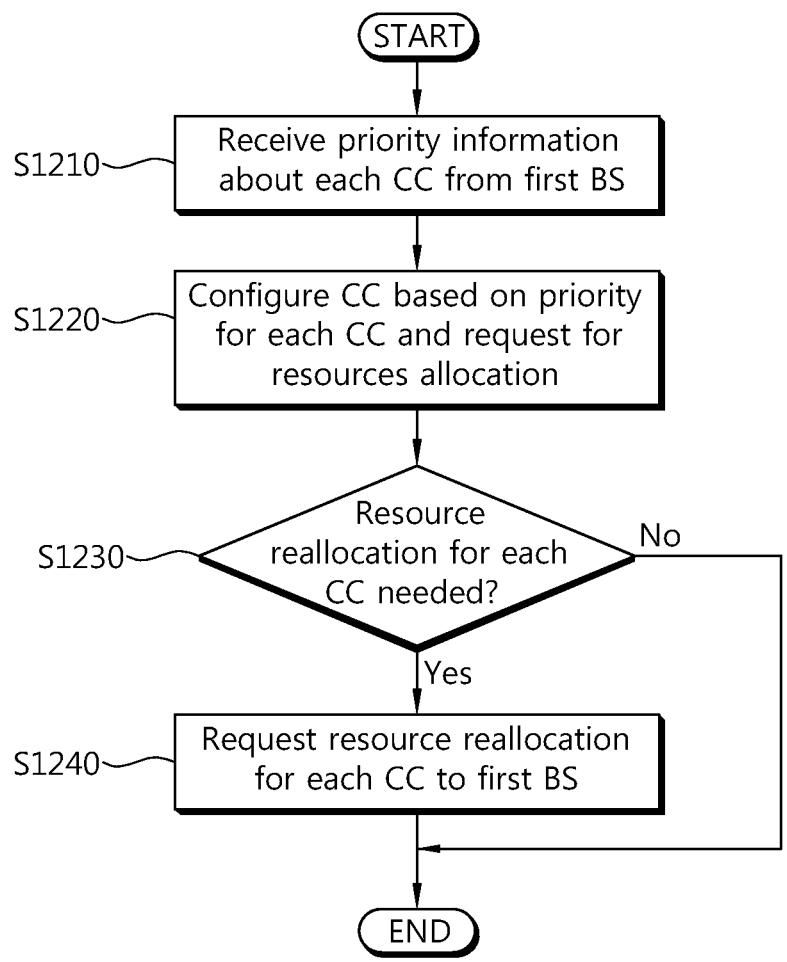
FIGS. 12 and 13 are flowcharts illustrating the operation of a reception apparatus connected to a second station which is included in the coverages of one or more first stations according to an embodiment of the present invention.
Figure 13:
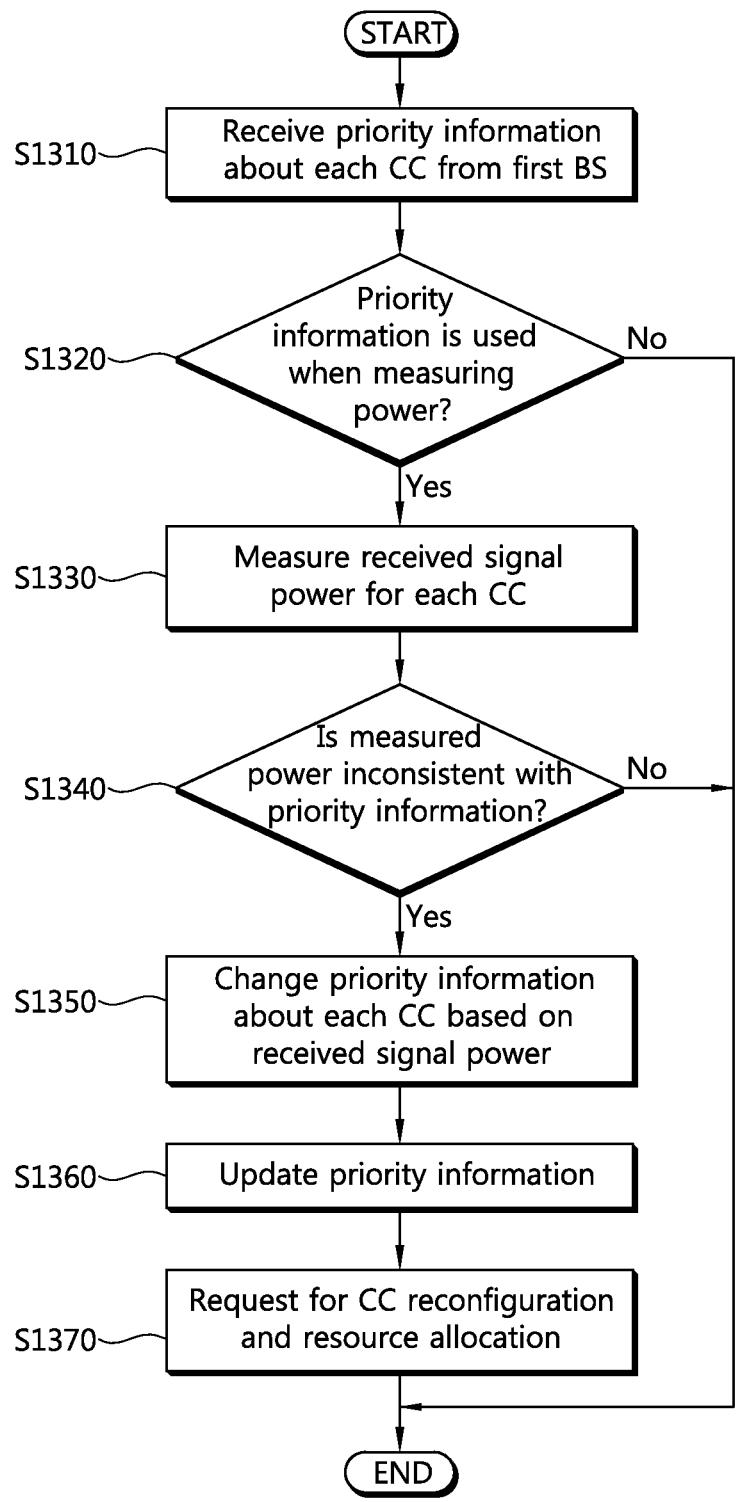

FIGS. 12 and 13 are flowcharts illustrating the operation of a reception apparatus connected to a second station which is included in the coverages of one or more first stations according to an embodiment of the present invention.

In the following description, the reception apparatus includes UE connected to a second station which is included in the coverages of one or more first stations. Meanwhile, a transmission apparatus is a fixed network node capable of communicating with the UE, and it may include a macro eNB, a pico eNB, a hot spot, or a femto eNB.

Referring to FIG. 12, UE receives priority information about each CC transmitted by a first eNB (S1210). Here, the first eNB may directly receive the priority information about each CC from a second eNB or calculate the priority information about each CC based on detailed use information about each CC which has been received from the second eNB. Next, the first eNB may broadcast the relevant priority information about each CC to UE(s) linked (connected) to the first eNB. Here, the broadcasted priority information about each CC is information used to coordinate interference in the frequency region of the UE and may also be called information for interference coordination.

Accordingly, all UE(s), that is, reception apparatuses liked to the first eNB may obtain 'priority information about each CC' and may periodically update the existing obtained information.

Meanwhile, a method in which the reception apparatus uses priority information about each CC is chiefly divided into two types. A CC configuration function and a CC resource allocation function using priority information about each CC, such as that shown in FIG. 12.

Referring back to FIG. 12, the reception apparatus which has received the priority information about each CC from the first eNB at step S1210 configures CCs using the received priority information about each CC, when first allocating resources in order to set up link with the first eNB, and requests resource allocation (S1220).

The reception apparatus may perform an overall CC configuration owing to a sudden decrease in the channel performance between users which have set up link with the first eNB or check whether resource reallocation for each CC is necessary if a change of priority information about each CC is great (S1230) and may request resource reallocation for each CC by requesting the resource allocation from the first eNB of the resource reallocation for each CC is necessary (S1240).

Through the process, the UE or the reception apparatus can promptly handle ICI and improve frequency efficiency by primarily using a CC having low ICI. Second, there is a resource allocation function using priority information about each CC and received signal power measurement information combination of a user, such as that shown in FIG. 13.

As in FIG. 13, a reception apparatus or UE receives priority information about each CC which has been transmitted by a first eNB (S1310). However, since average ICI within a cell is taken into consideration in the priority information about each CC, an ICI environment for each CC may not be identical with the received priority information according to circumstances. Accordingly, the reception apparatus may use a process of measuring received signal power for each CC and comparing the measured received signal power for each CC.

Accordingly, the reception apparatus determines whether or not to use the priority information about each CC, received from the first eNB, when measuring the received signal power on each CC (S1320) and measures received signal power on each CC (S1330). The step S1320 of determining whether or not to use the priority information about each CC, received from the first eNB, when measuring the received signal power on each CC may be performed by determining whether to measure received signal power on each CC according to a common power measurement method or whether to measure a received signal with consideration taken of priority information about each CC (information received from the first eNB) according to the present embodiment, when measuring Reference Signal Received Power (RSRP).

In an LTE system, the measurement period of Intra-frequency RSRP is set to 200 ms. UE reports the average value of RSRP measuring for the 200 ms period to an eNB. In an LTE-A system, the same process is performed for each CC. Accordingly, the measurement of received signal power described in the present embodiment is not an operation additionally performed for the proposed invention, but is one of operations performed by UE in the existing system operating processes.

Next, the reception apparatus determines whether the measured received signal power on each CC is inconsistent with the priority information about each CC (S1340).

If the measured received signal power on each CC conflicts with the priority information about each CC, the reception apparatus changes priority for each CC based on the measured received signal power on each CC (S1350).

An example in which the measured received signal power on each CC conflicts with the priority information about each CC may include, for example, that, although priority for each CC is the next priority, the amount of received signal power measured by a user is a reference or higher, but not limited thereto. The example may include all the cases where specific coordination is necessary for priority for each CC determined by a femto eNB.

Furthermore, the process of changing priority for each CC based on the measured received signal power on each CC may include a process in which, although priority for each CC is the next priority, but the amount of received signal power measured by a user is a reference or higher, primarily requesting resource allocation to the next-priority CC, but not limited thereto.

After changing priority for each CC based on the measured received signal power on each CC, the reception apparatus updates priority information about each CC (S1360) and requests a CC configuration, requests a change of a preferred CC, or request resource allocation for each CC based on the updated priority information about each CC (S1370).

Accordingly, the embodiment of FIG. 13 may supplement a coverage hole in a scheme of forming link or allocating resources by sing only priority user information about each CC.

In FIGS. 12 and 13, in case of the same communication system, the cell coverage of the first eNB is included in the cell coverage of the second eNB. For example, the first eNB may be a femto eNB, and the second eNB may be a macro eNB. Furthermore, in case of heterogeneous communication systems, the first eNB may be a communication device supporting Bluetooth or an 802.11 WLAN system, and the second eNB may be an eNB connected to an LTE system.

Figure 14:
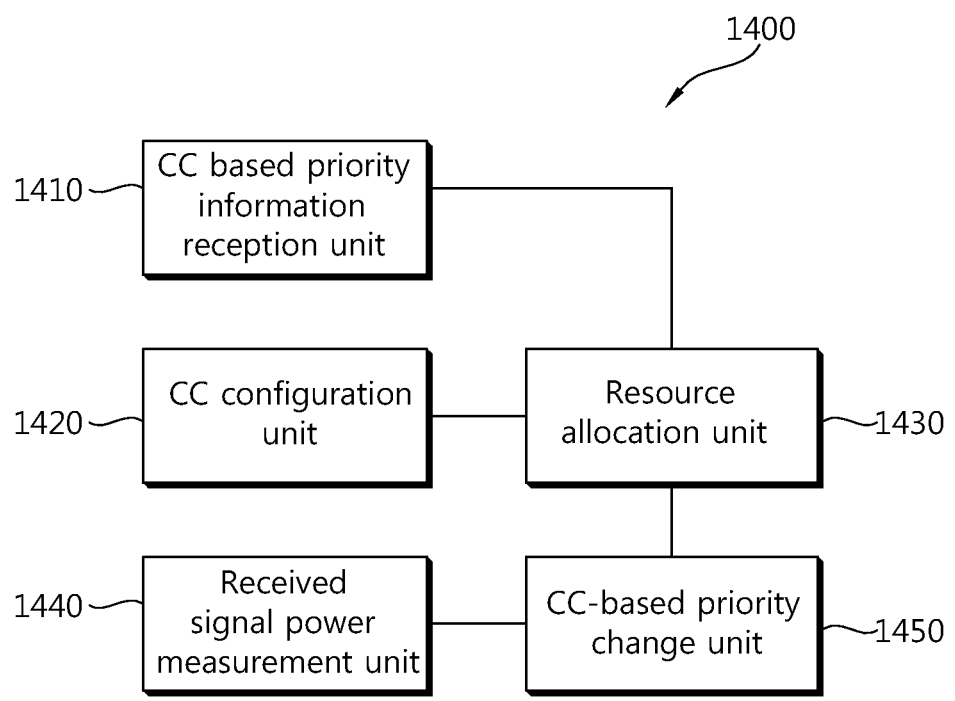
FIG. 14 is a block diagram of a reception apparatus to which the present embodiment is applied.

FIG. 14 is a block diagram of a reception apparatus to which the present embodiment is applied. Here, the reception apparatus may be a station, such as UE, that is, a mobile network node within a homogeneous network system or an element of the station. Alternatively, the reception apparatus of FIG. 14 is devices coupled to UE within heterogeneous network systems or the elements of the devices.

The reception apparatus 1400 according to the present embodiment basically includes a CC-based priority information reception unit 1410, a CC configuration unit 1420, and a resource allocation unit 1430. If a function of changing priority for each CC is changed based on received signal power on each CC, the reception apparatus 1400 may further include a received signal power measurement unit 1440 and a CC-based priority change unit 1450.

Referring to FIG. 14, the CC-based priority information reception unit 1410 performs a function of receiving "priority information about each CC" meaning priority for each CC. The priority for each CC is determined by the preferred CC set determination apparatus 1100 according to one or more of the first method to the third method. Furthermore, the preferred CC set determination apparatus 1100 may be included within a femto eNB or an HeNB, that is, a first eNB or implemented within a macro eNB, that is, a second eNB or an MME/SAE, a gateway, or another server, that is, another core network element. Furthermore, in case of heterogeneous communication systems, the first eNB may be an eNB connected to an LTE system, and the second eNB may be a communication device which supports Bluetooth or an 802.11 WLAN system.

The CC configuration unit 1420 and the resource allocation unit 1430 basically perform functions of configuring CCs using received priority information about each CC and of requesting resource allocation, but may further perform functions of configuring all CCs again owing to a sudden decrease of channel performance, requesting a change of preferred CCs when priority information about each CC is greatly changed, or requesting resource reallocation for each CC from a femto eNB if resource reallocation for each CC is necessary.

In this specification, the CC configuration unit 1420 and the resource allocation unit 1430 are separately described, but may be integrated into one block in software or hardware according to circumstances or may be implemented in a form added to other elements.

Furthermore, although not shown, a CC set determination unit for determining a preferred CC set based on priority information about each CC which is received from a femto cell may be further included.

Furthermore, the CC-based priority information reception unit 1410 or CC set determination unit may periodically receive information in a preset period, check whether there is a change in the existing preferred CC set, and perform an update process if the preferred CC set needs to be updated because there is a change in the priority information about each CC.

The received signal power measurement unit 1440 performs a function of measuring received signal power on each CC and transferring the measured received signal power to the CC-based priority change unit 1450.

The CC-based priority change unit 1450 performs a function of determining whether measured received signal power on each CC conflicts with priority information about each CC and changing priority for each CC based on measured received signal power on each CC if the measured received signal power on each CC conflicts with the priority information about each CC.

An example in which the measured received signal power on each CC conflicts with the priority information about each CC and thus priority for each CC is changed (updated) may include, for example, an example in which, if the amount of received signal power, measured by a user, is a reference or higher although the priority for each CC is the next priority, resource allocation to the next CC is primarily requested, but not limited thereto and includes all the cases where specific coordination is necessary for priority for each CC which has been determined by a femto eNB.

After changing the priority for each CC based on the measured received signal power on each CC, the CC configuration unit 1420 and the resource allocation unit 1430 request a CC configuration or request resource allocation for each CC based on the changed (updated) priority information about each CC.

If the present embodiment is used, in multi-layer or heterogeneous network systems including a femto cell (a second cell or a second network node) included in one or more macro cells (first cells or first network nodes), when allocating one or more of a plurality of CCs to a femto cell, the femto cell eNB primarily defines a preferred CC set, that is, CCs which may set up link with UE by taking ICI due to neighboring macro cells and then uses the CCs. Accordingly, ICI can be efficiently reduced.

Furthermore, there are advantages in that a femto eNB may be provided with an environment in which more stable link with UE can be set up and a plurality of CCs can be efficiently operated. Furthermore, in accordance with the present embodiment, in a communication environment in which Orthogonal Frequency Division Multiplexing (OFDM)/OFDMA-based various cells using a plurality of CCs are mixed, in a CC configuration between a femto cell eNB and UE, a CC configuration method in which a femto cell eNB can minimize interference from a neighboring macro cell by using a preferred CC is proposed. Accordingly, there are advantages in that ICI due to heterogeneous networks can be reduced and transmission efficiency can be improved.

In accordance with the present invention, in a communication system in which a second network node exists within a first network node, ICI can be lowered, transmission efficiency can be improved, and a plurality of CCs can be efficiently operated.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed to limit the technical spirit of the present invention, but should be construed to illustrate the technical spirit of the present invention. The scope of the technical spirit of the present invention is not limited by the embodiments, and the scope of the present invention should be interpreted based on the following appended claims. Accordingly, the present invention should be construed to cover all modifications or variations induced from the meaning and scope of the appended claims and their equivalents.

What is claimed is:

1. A method for performing interference coordination in a multiple component carrier system by user equipment (UE), comprising:
    receiving, from a base station (BS), information about a preferred Component Carrier (CC), including at least one CC to be primarily allocated to a second cell based on use information about a CC allocated to a first cell;
    checking priority of CCs to be used by the UE based on the information about the preferred CC including the at least one CC; and
    requesting, to the BS according to the checked priority, at least one of a reconfiguration request for at least one CC, a resource allocation request for at least one CC to be used, and a change request for the preferred CC.

2. The method as claimed in claim 1, wherein the information about the preferred CC including the at least one CC is transmitted by at least one of a Radio Resource Control (RRC) message, a Medium Control Access (MAC) message, and physical layer signaling.

3. The method as claimed in claim 1, wherein the information about the preferred CC includes priority information about the preferred CC.

4. The method as claimed in claim 1, wherein checking the priority comprises:
    measuring received signal power of each CC of the information about the preferred CC; and
    determining whether the measured received signal power is different from priority information in the information about the preferred CC.

5. The method as claimed in claim 1, wherein the use information about the CC comprises at least one of service coverage information, load factor information, and supported/non-supported CC information about each CC.

6. The method as claimed in claim 1, wherein if the first cell and the second cell are supported by an identical wireless communication system, the BS is a station controlling the second cell, and the UE is connected to the station controlling the second cell.

7. The method as claimed in claim 6, wherein the station controlling the second cell is a femto base station.

8. User equipment (UE) to perform interference coordination in a multiple component carrier system, comprising:
    a preferred Component Carrier (CC) information reception unit to receive information about a preferred CC, including at least one CC to be primarily allocated to a second cell based on use information about a CC allocated to a first cell;
    a CC configuration unit to check priority of CCs to be used by the UE based on the information about the preferred CC including the at least one CC; and
    a resource allocation unit to transmit, to a base station (BS) according to the checked priority, at least one of a reconfiguration request for at least one CC, a resource allocation request for at least one CC to be used, and a change request for a preferred CC.

9. The UE as claimed in claim 8, wherein the preferred CC information reception unit receives the information about the preferred CC, including the at least one CC, through at least one of a Radio Resource Control (RRC) message, a Medium Control Access (MAC) message, and physical layer signaling.

10. The UE as claimed in claim 8, wherein the CC configuration unit is connected to a power measurement unit to measure received signal power of a CC based on the information about the preferred CC which is checked by the preferred CC information reception unit and is connected to a priority information change unit to determine whether the measured received signal power is different from priority information in the information about the preferred CC and to change, based on the determination, the priority of the CCs to be used by the UE.

11. The UE as claimed in claim 10, wherein the priority information change unit changes the priority of the CCs to be used by the UE based on the use information about the CC, including at least one of service coverage information, load factor information, and supported/non-supported CC information about each CC.

12. The UE as claimed in claim 8, wherein if the first cell and the second cell are supported by an identical wireless communication system, the UE is connected to a station controlling the second cell.

13. The UE as claimed in claim 8, wherein the UE is connected to a femto base station controlling the second cell.

* * * * *